United States Patent [19]

Campbell et al.

[11] Patent Number: 5,369,135
[45] Date of Patent: Nov. 29, 1994

[54] CONTROLLED MICROCELLULAR FOAMS OF CRYSTALLINE AMORPHOUS POLYMERS

[75] Inventors: Gregory A. Campbell; Don H. Rasmussen, both of Canton, N.Y.

[73] Assignee: Mobil Oil Corporation, Fairfax, Va.

[21] Appl. No.: 882,466

[22] Filed: May 13, 1992

[51] Int. Cl.⁵ .............................................. C08L 27/00
[52] U.S. Cl. ................................... 521/134; 521/138; 521/139; 521/142; 521/143; 521/145; 521/147; 521/149; 523/201; 525/902
[58] Field of Search ..................... 521/139, 79, 81, 97, 521/98, 142, 143, 134, 138, 145, 147, 149; 525/902; 523/201

[56] References Cited

U.S. PATENT DOCUMENTS

| | | | |
|---|---|---|---|
| 3,608,005 | 9/1971 | Fortner | 264/45 |
| 3,929,686 | 12/1975 | Stevenson | 521/89 |
| 4,075,265 | 2/1978 | McClung et al. | 264/53 |
| 4,473,665 | 9/1984 | Martini-Vvedensky et al. | 521/79 |
| 4,598,101 | 7/1986 | Krutchen et al. | |
| 4,696,776 | 10/1987 | Hooker et al. | 264/46.4 |
| 4,761,256 | 8/1988 | Hardenbrook et al. | |
| 5,160,674 | 11/1992 | Colton et al. | 264/50 |

OTHER PUBLICATIONS

"The Nucleation of Microcellular Thermoplastic Foam" by Jonathan S. Colton, MIT Sep. 1985.
"The Production and Analysis of Microcellular Foam" by Jane E. Martini, MIT Jan. 1981.
"The Processing of Microcellular Foam", by Francis A. Waldman, MIT Jan. 1982.

*Primary Examiner*—John Kight, III
*Assistant Examiner*—John M. Cooney, Jr.
*Attorney, Agent, or Firm*—Alexander J. McKillop; Malcolm D. Keen; L. Gene Wise

[57] ABSTRACT

Controlled foams of crystalline amorphous polymers include a second phase polymeric material having a transition temperature below that of the matrix polymeric material. The second phase material provides nucleating sites for the growth of gas formed cells which are limited in size by the particle size of the second phase polymeric material.

39 Claims, 4 Drawing Sheets

CONTROLLED MICROCELLULAR FOAMS OF CRYSTALLINE AMORPHOUS POLYMERS

FIELD OF THE INVENTION

This invention relates to microcellular foams of crystalline polymers and more particularly, to a composition which includes a second phase polymeric material having a transition temperature below that of the matrix material to provide nucleating sites for the growth of gas-formed cells which are limited in size by the particle size of the second phase material.

BACKGROUND OF THE INVENTION

Microcellular foams for use in packaging, containers, films, and the like have been reported. See U.S. Pat. No. 4,473,665—Martini-Vredensky, Suh and Waldman; U.S. Pat. No. 4,761,256—Hardenbrook, et al; and Ph.D. Thesis, MIT 1986, Jonathan Colton. In this prior art, small cell size is obtained by quenching the material during the formation of the cells at the appropriate time to control the size of the cells.

Various methods of density reduction have been investigated. These approaches cause a nearly linear film property reduction with bulk density. These techniques typically use a chemical blowing agent (CBA) to create foam structure in polyethylene. Most used two or three layer coextrusions with foam comprising the "core". The best material made using this approach still has significant property degradation with density reduction. However, the data shows that as cell size decreases and cell uniformity increases film properties suffer far less. This suggests that very fine, well controlled cells could reduce bulk density while retaining acceptable properties.

Recently several articles have disclosed research into very fine cell foams or microfoams, with cells between 3 and 10 microns. This shows the interesting result that microcells improve rather than decrease impact properties of plaque molded samples. These small foam cells prevent crack growth in the matrix by dissipating the force at the crack tip over a much wider area similar to the effect of rubber particles in high impact polystyrene (HIPS). Typical cell sizes for "fine cell" styrene foams are 100+ microns and, although they have better impact properties than coarser foam structures, they are poorer than the styrene matrix. Microfoaming creates an impact resistant structure that has better properties than the unreduced matrix.

The method reported in the literature to create a microcellular foam is to add a material to the molten polymer at its solubility limit at the polymer melt temperature. This material is molded into a plaque sample and rapidly quenched. Plaques are put into a Paar bomb and saturated with a gas (nitrogen, carbon dioxide) at elevated pressures for times sufficient to ensure gas diffusion into the polymer matrix. Samples are then quickly heated to reduce matrix viscosity, increase gas volatility in the matrix and create micro foam. A material added at its solubility limit will supposedly create nucleating sites for foam cells as the molten polymer cools and the material precipitates from solution. Since the material is soluble and hence uniformly distributed, the nucleation sites are uniformly distributed throughout the matrix. The site size is very small since nucleation occurs on the forming precipitate which can be clumps as small as several molecules. This nucleation mechanism has been referred to as "pseudo-homogeneous" since the effect of the added material as a typical nucleant is unclear. Zinc stearate and stearic acid have been used as nucleants in this manner.

Much of the work recently reported in the literature originated at MIT and Dr. Nam Suh. Several theses were published (The Production and Analysis of Microcellular Foam, J. E. Martini, MS thesis, 1981; The Processing of Microcellular Foam, F. A. Waldman, MS thesis, 1980; The Nucleation of Microcellular Thermoplastic Foam, PhD thesis, 1985) and later reported in various journal articles. The aforementioned U.S. Pat. No. 4,473,665 titled "Microcellular Closed Cell Foams and Their Method of Manufacture; Saturation With Inert Gas, Depressurization and Quick-Cooling" is a process patent describing the microfoam method. Microfoam work at MIT spans about ten years and includes work in both crystalline as well as amorphous polymers. The bulk of the work reported has been in various styrene matrices due to processing ease and subsequent characterization.

Polycarbonate foams, polyetherimide (Ultem ®) foams, polyphenylene oxide/polystyrene or HIPS foams, Noryl ®, are also in use. See, for example, U.S. Pat. No. 4,598,101.

SUMMARY OF THE INVENTION

In accordance with the present invention, a microcellular foamed polymer composition includes a polymer matrix material and a second phase polymeric material having a transition temperature below the transition temperature of the matrix material. As used herein, transition temperature means glass transition point or the melting point of the material. The second phase material is originally present as discrete nucleating particles for the formation of a plurality of closed cells in the foamed polymer composition.

In accordance with the invention, foamed amorphous and crystalline polymers such as polystyrene, polyethylene, polystyrene acrylo nitril (SAN), polyphenylene oxidepolystyrene, polycarbonate, polyetherimide, polypropylene, nylon, teflon, and other polymers include a second phase which has a transition temperature below that of the matrix polymer. The second phase provides sites which can be activated for bubble nucleation. The number of sites per unit volume of unfoamed matrix resin is controlled by the volume fraction of second phase, the degree of dispersion of this phase and the extent of activation of these sites as bubble nuclei.

As an example, HIPS is incorporated into the crystalline resin and the density and size of the rubber particles emplanted from the HIPS determines the number of activatable bubble nucleation sites. The number of bubbles per unit volume of unfoamed resin approximates the number of activatable rubber particles.

DESCRIPTION OF THE PREFERRED EMBODIMENT

Figures 1, 2:
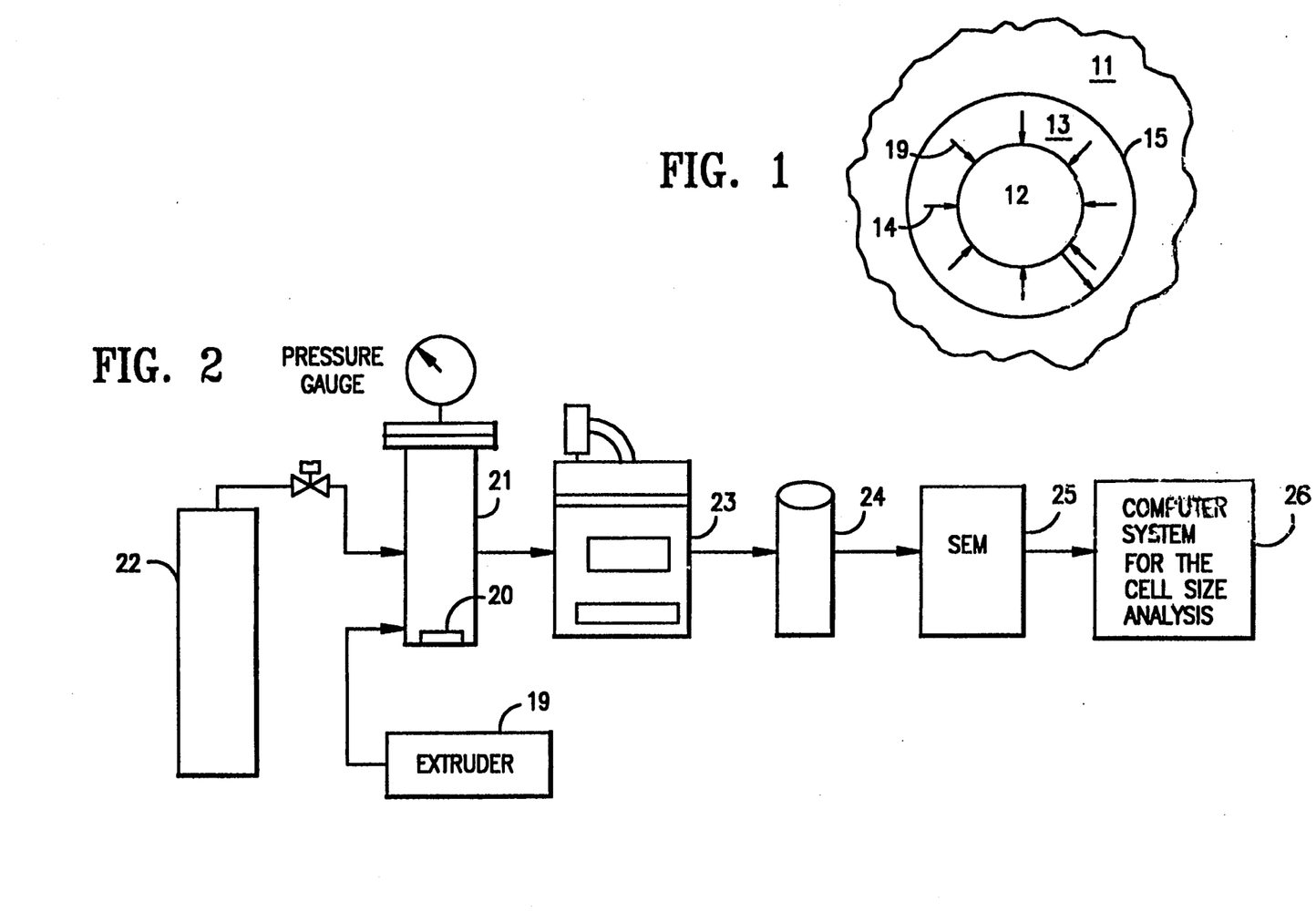
FIG. 1 is a schematic diagram of a model cell depicting the nucleation and formation of the cell.
FIG. 2 depicts the apparatus and process that was used to produce the microcellular foams of the examples.

FIG. 1 is a schematic diagram of a model of the cell formation in a polymer matrix of the present invention. A polymeric matrix material 11 has cells 12 which are formed by a second phase polymeric material 13. The second phase material has a glass transition or melting temperature below the transition temperature of the polymeric matrix material 11. As the composition is heated and cooled, the second phase material nucleates a cell. As the composition is heated and cooled, the transition temperature of both the matrix material and the second phase material is exceeded. As the composition is cooled, the matrix material goes through its transition temperature. Now there is a marked difference in the thermal expansion coefficient between the matrix material and the second phase material. The matrix material shrinks much slower (for example, five times slower) than the second phase material. This puts tensile stress on the interface. This stress produces a void which ultimately becomes a cell. Gas under pressure, depicted by the arrows 14, enters the cell 12 and it expands. The expansion of the cell is limited by the physical size of the particle in the second phase material. The outer limits of this matrix are depicted by the circle 15 which is at the boundary between the polymeric material 11 and the second phase material 13. Second phase material 13 is originally present in the matrix as a discrete nucleating particle prior to development of cell 12. The size of these discrete particles is from 0.02 to 10 microns.

Elastomers, particularly rubber particles, are particularly suitable second phase materials. Rubber in high impact polystyrene or in latex has been successfully used as a nucleating agent. HIPS is a source of rubber particles which can be compounded into almost any polymer at 0.1 to 10% and not substantially change the base polymer properties. Rubber latex is a rubber/liquid, water based emulsion.

Examples of compositions including matrix material and second phase material which have the requisite transition temperatures are:

| MATRIX MATERIAL | SECOND PHASE MATERIAL |
| --- | --- |
| Polystyrene | Rubber |
| Polycarbonate | Rubber |
| Polyester | Rubber |
| Polyethylene | Rubber |
| Polyethylene | Polystyrene |
| Polyetherimide | Polypropylene |
| Polyetherimide | Polyethylene |
| Polyphenylene oxide/polystyrene | Rubber |

Polyetherimide is sold under the trade name Noryl ® by the General Electric Company. Polyphenylene oxide/polystyrene is sold under the trade name Ultem ® by the General Electric Company.

FIG. 2 depicts the apparatus which produced the compositions of the examples. FIG. 2 also depicts the process for producing the compositions of the present invention.

Extruder 19 compounds the polymeric matrix material and the second phase material to produce samples. During extrusion, the material is above the transition temperature of the matrix material. Merely cooling below the matrix transition temperature is sufficient to activate the cell nucleation process. A sample 20 is placed in pressure vessel 21 where the sample is impregnated with gas at an elevated pressure, for example, from the nitrogen cylinder 22. Any gas can be used, including nitrogen, carbon dioxide, helium, argon, and $NO_x$. These can be combined with conventional blowing agents such as CFCs, carbon dioxide, methylene chloride, pentane, etc. Anything that is soluble in the second phase material (rubber) and which has a vapor pressure substantially above the ambient pressure during the foam nucleation and expansion at temperature is suitable for use.

The gas impregnated samples are heated in the high temperature bath 23 to foam them. The samples are then slowly cooled to room temperature. The samples may then be quenched in the liquid nitrogen flask 24 and fractured to expose the foam cells. It has been found that rapid quenching is not necessary for the samples produced with HIPS or latex as the second phase material.

A scanning electron microscope 25 was used to produce photo micrographs of the foamed samples and a computer system 26 was used for cell size analysis.

EXAMPLES

The polymer samples were blended using two procedures. The first procedure utilized a twin screw extruder. The second procedure used a laboratory rheomex single screw extruder with a 1" barrel and a dc drive control system which gave variable speeds from 0 to 250 rpm. The extruder was equipped with a right angle die and a capillary such that the extrudate was extruded at a diameter of 3/32". For all of the materials that were compounded, the extruder was operated at the maximum shear rate (rotation speed of the screw) that could be tolerated without exceeding the limitations of the pressure disk that was attached to the extruder. The extrudate was cooled in air or a hot water bath and pelletized using a laboratory pelletizer. The resulting pellets were then in some cases remixed and reextruded to provide a double pass through the extruder to improve the dispersion.

The different polymer samples were loaded in a Parr autoclave. The autoclave was then sealed and nitrogen gas was administrated into the autoclave at a pressure up to 2,000 pounds per square inch. The samples were then left in the autoclave for up to 7 days to obtain permeation of the nitrogen gas into the polymeric materials. The materials were then removed from the autoclave and subjected to a heat flux environment of a hot oil bath, microwave oven, or a convective hot air oven at different temperatures. The foaming characteristics of the materials were observed during the heating. The foams were removed from the high temperature, allowed to cool slowly to room temperature, and stored at room temperature until they were analyzed. The foamed materials and the precursors were then evaluated using scanning electron microscopy to determine the degree of dispersion of the second phase nucleation agent and the type and consistency of the microcellular foam that was produced.

Foams nucleated with rubber latex and HIPS were produced by nitrogen saturation of an LLDPE dispersion at about 2,000 psi pressure and subsequent heating in an oil bath or a convective oven.

Example 1

Latex was allowed to dry on linear low density polyethyelene (LLDPE) pellets in order to facilitate the addition of the mixture in the extruder. The rubber latex was compounded in the LLDPE using a single screw bench top extruder running at maximum rpm. The materials were extruded into a water bath. The extrudate was cooled and cut into pieces. Nitrogen gas was permeated into the linear low density polyethylene (LLDPE)latex pieces under pressure (up to 2,000 psi). The pieces were removed from the pressure and heated. When heated, foaming occurred. The original latex had approximately 0.1 micron diameter particles and electron microscopy indicates that the final particle size in the dispersion ranges from 0.5 to 1.2 microns. The LLDPE/latex blends were foamed at approximately 165° C. in a convective hot air oven. Foams were produced with bubble diameters between 10 and 100 microns depending upon the heat flux during foaming.

Example 2

A foamable material was blended using the same single screw extruder with 20 to 40 volume percent of HIPS in LLDPE. Foams were produced with cell sizes in the neighborhood of 10 micron in diameter.

Example 3

Figure 3:
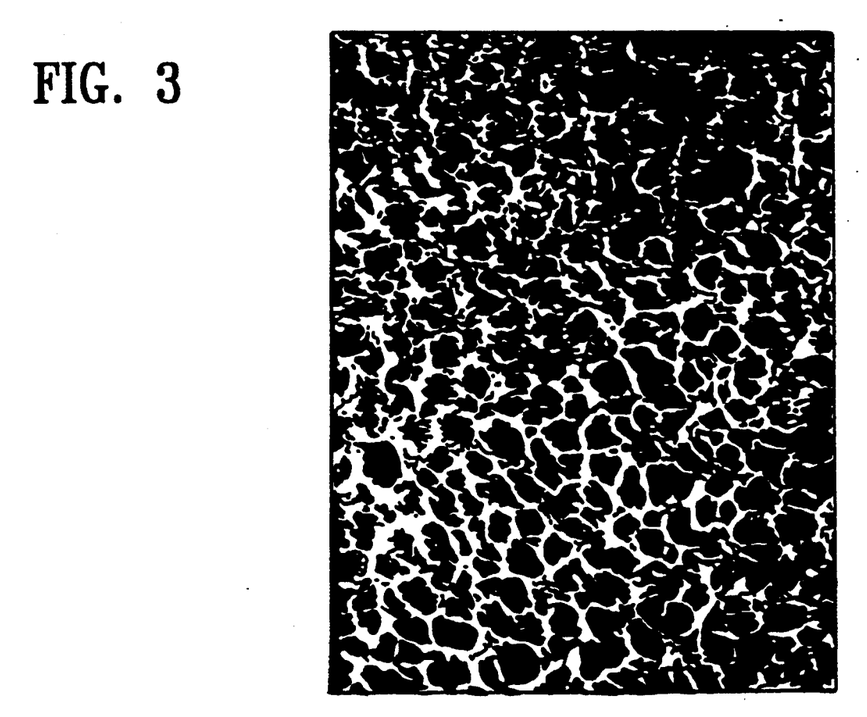
FIG. 3 is a representation of a scanning electron micrograph of foams produced from polyphenylene oxide and HIPS.

Noryl ® material (General Electric) with a 1:1 weight ratio of polypropylene oxide (PPO)/HIPS was microcellularly foamed using the above procedures. This composition has about 15 volume percent rubbery particles. The temperature of the foaming was 165° C. The material foamed well as demonstrated in FIG. 3.

Example 4

Figure 4:
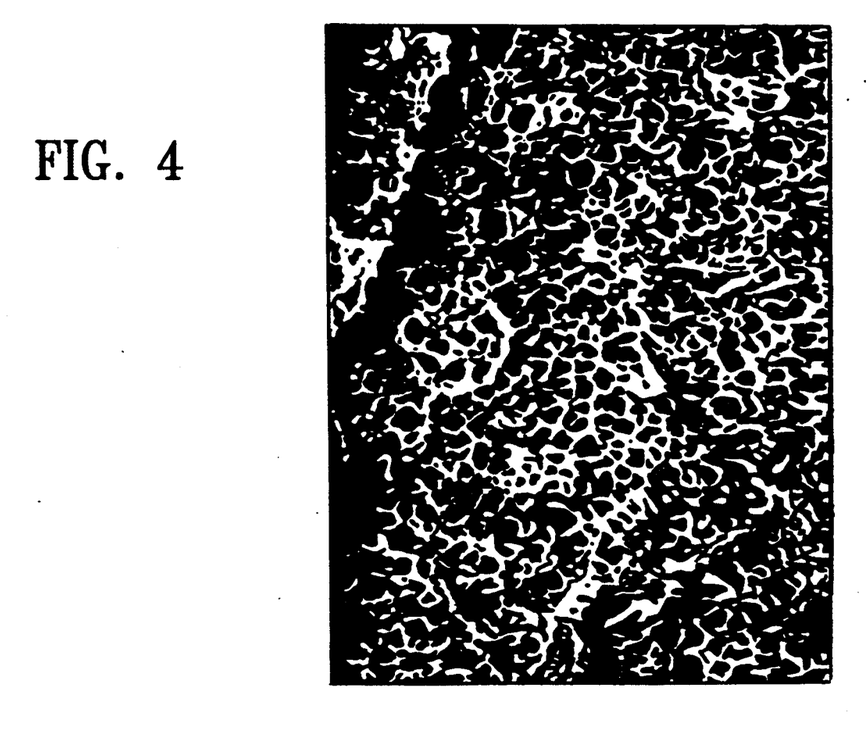
FIG. 4 is a representation a micrograph of foams produced in a manner similar to that of FIG. 3.

Foams are produced from polystyrene blended with polymer having rubber with particle size of 250 angstroms. These rubber particles are the glass transition phase of a block copolymer. The polymer was saturated at 13.8 MPa with nitrogen and foamed in an ethylene glycol bath. The cell size is greater than 10 microns. This same material was compounded into polystyrene, a typical amorphous polymer, so that the rubber particles were approximately $10^8$ per cubic centimeter of unfoamed resin. The material was treated in the same way. It was saturated at 13.8 megapascals and it was heated to approximately 388° K. FIG. 4 is a representation of a photo micrograph of the resultant material with cell sizes in the 3-5 micron range.

Example 5

Figure 5:
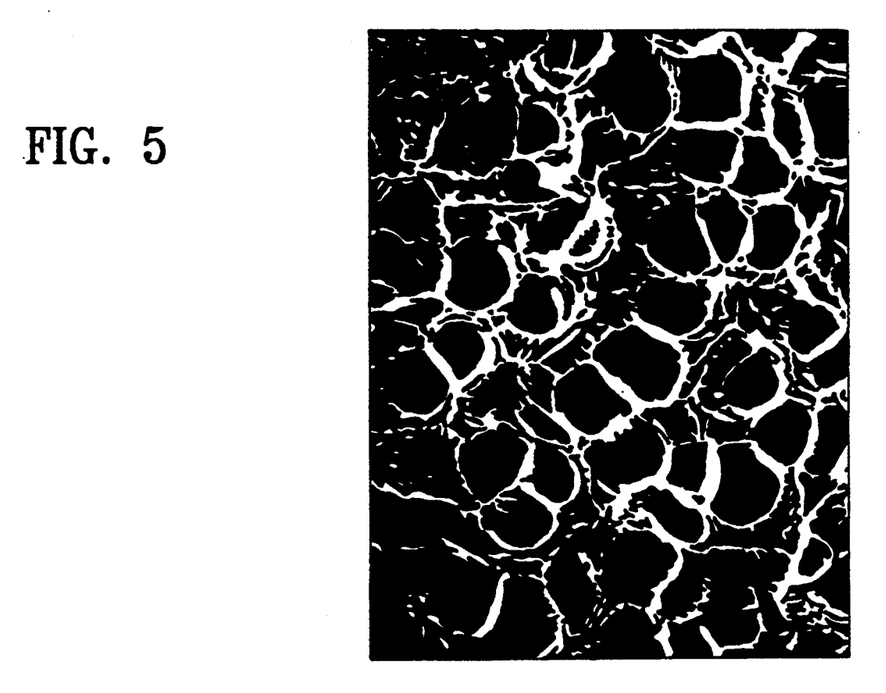
FIG. 5 is a representation a micrograph of a foam produced with raw HIPS with no second phase material added.

High impact polystyrene, with a particle size of about 2 microns and about 30 volume percent rubbery particles (hereafter identified as HIPS 5400) was subjected to the same foaming conditions as previously given. It was heated to approximately 115° C. at 2,000 psi. FIG. 5 is a representation a photo micrograph of the foamed material. Note that the cells produced had a size in excess of 30 microns.

Example 6

Linear low density polyethylene, LLDPE, a typical semi-crystalline polymer, was foamed with HIPS 5400, HIPS 7800 (0.8 micron particle size) with a nominal molecular weight of 200,000 and crystalline polystyrene identified as (PS 1500) as second phase materials, following the process conditions described above. HIPS 5400 has a typical salami type rubber particle with many small particles of polystyrene in each rubber particle. The average rubbery particle size of 5400 is about 2 microns. HIPS 7800 has core shell rubber particles of about 0.8 microns. PS 1500 is pure polystyrene. These materials were compounded into the LLDPE using a twin screw extruder at concentrations from 2.0 to 18 volume percent. Data showing cell size supports the conclusion that the addition of materials with a transition temperature below that of the matrix polymer nucleates a foam and leads to controlled foaming. The data show that the density goes down with increased saturation pressure. For example, using a one melt index LLDPE and HIPS with a particle size of 0.8 microns the density went from 0.94 to 0.53 as the pressure is increased from 0 to 2000 psi. As the number of particles activated are increased, the density increases because the gas is distributed over more cells.

Example 7

Several experiments were performed to demonstrate the effect of process pressure, process temperature, and rubbery particle size on foam cell size. The results are presented in FIGS. 6, 7, and 8.

Figure 6:
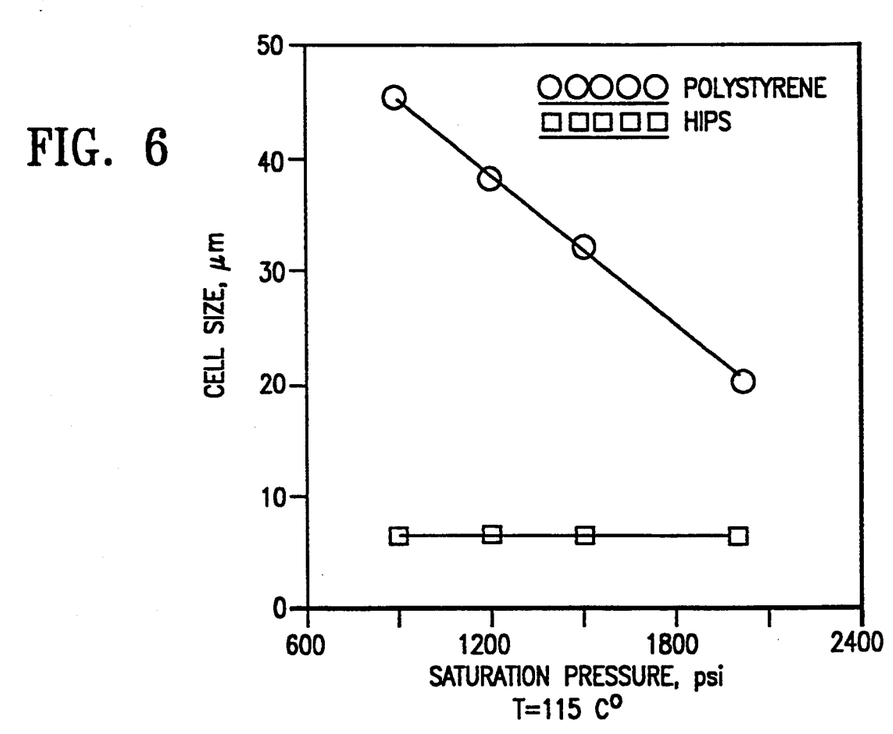
FIG. 6 includes graphs depicting the independence of cell size to process pressure.

FIG. 6 is a graph showing cell size as a function of process pressure for several samples. The circles depict samples of polystyrene without second phase material and the rectangles depict the same polystyrene with HIPS added. The samples which include the second phase polymeric material with a lower transition temperature demonstrate minimal dependence of cell size to process pressure. On the other hand, the samples produced under the same process conditions, but without second phase material being added, demonstrate a strong dependence on process pressure.

Figure 7:
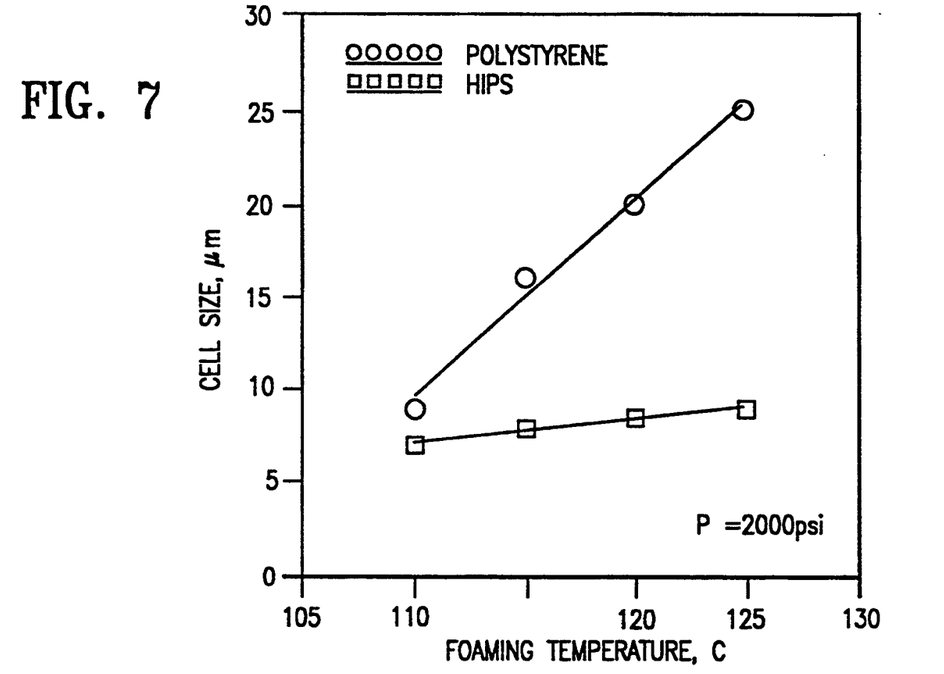
FIG. 7 includes graphs showing the independence of cell size to process temperature.

FIG. 7 shows graphs of cell size versus process temperature for various samples with and without a second phase material being added. The samples depicted by rectangles are compositions which include a second phase material having a transition temperature below that of the matrix material. These samples show minimal dependence of cell size for various process temperatures. The samples without the added second phase, which were processed under similar conditions, show a strong dependence of cell size on process temperature.

Figure 8:
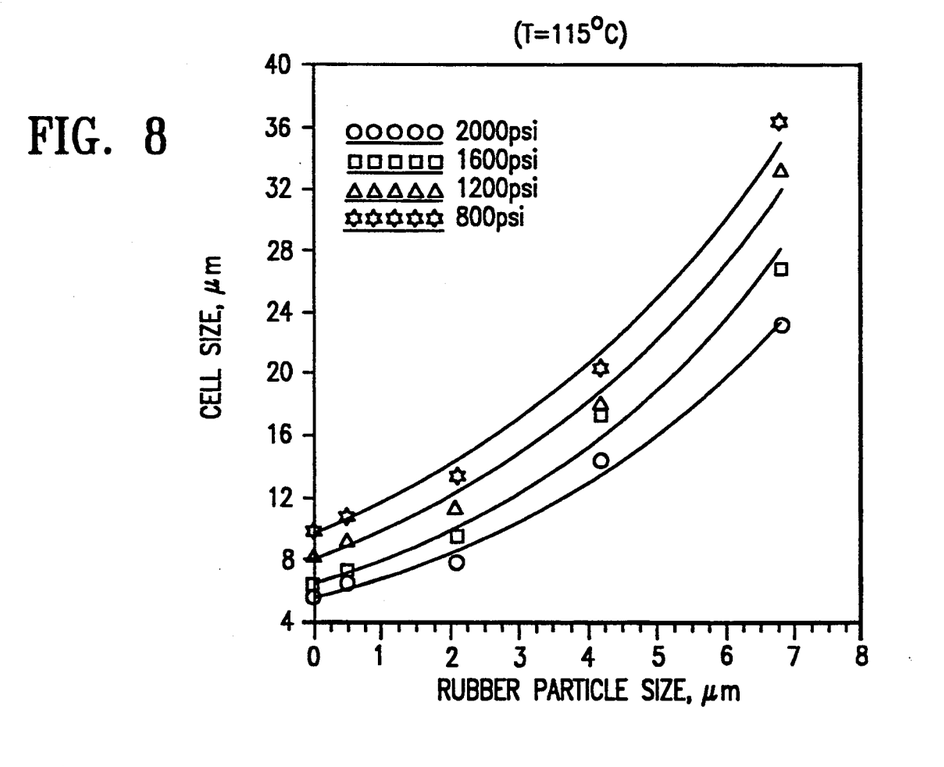
FIG. 8 includes graphs showing cell size as a function of the rubber particle size.

FIG. 8 shows the influence of rubber particle size on cell size. Cell size as a function of the particle size is depicted for various process pressures. This demonstrates that the cell size can be selected by selecting the proper nucleating particle to be included as the second phase material.

Examination of the fracture surfaces of these foams produced using the second phase materials and using oxygen plasma demonstrated that the second phase was substantially distributed over the interior surface of the cells. This material controls the growth of the cells.

Example 8

An amorphous polymer matrix with about 0.3 percent rubber particles was saturated with nitrogen, plasticated in an extrusion device, and injected into a mold. The foamed polymer entered the room temperature mold at an approximate temperature of 165° C. The part had a fine, about 10 micron, cell size and a substantially lower density than a pure polystyrene produced under similar conditions.

Example 9

Pure polystyrene was saturated with nitrogen at an elevated pressure and extruded using a single screw extruder fitted with a capillary die at 165°. The resulting foam cells had a broad distribution with an average cell size well above the desired 10 micron size. The experiment was repeated while adding 0.3 percent rubber particles to the polystyrene. The resulting foam rod was slowly cooled in the ambient air and it had a narrow cell size distribution with an average size of about 10 microns.

Example 10

Polystyrene was saturated at room temperature with carbon dioxide. It was then heated in a microwave oven. It produced large nonuniform cells. The same experiment was performed using polystyrene with 0.03 percent rubbery second phase. The resulting foam had cells of about 10 micron size and produced parts suitable for use in transport of fragile equipment.

While a particular embodiment of the invention has been shown and described, various modifications are within the true spirit and scope of the invention. The appended claims are, therefore, intended to cover all such modifications.

What is claimed is:

1. A microcellular foamed polymer composition comprising:
    a polymer matrix material selected from the group consisting of polyester, polyethylene, polystyrene acrylonitril, polyphenylene oxide/polystyrene, polycarbonate, polyetherimide, polypropylene, nylon, and teflon; and
    a plurality of closed cells, located within said polymeric matrix material, comprising a gas enclosed by a shell comprising a second phase solid polymeric material which has a transition temperature below the transition temperature of said polymeric matrix material, said second phase polymeric material being a nucleating agent for said plurality of closed cells.

2. The foamed polymer of claim 1 wherein the size of the closed cells is below 40 microns.

3. The foamed polymer of claim 2 wherein said second phase polymeric material has submicron spheres of rubber which act as nucleation sites.

4. The foamed polymer recited in claim 2 wherein said second phase polymeric material is high impact polystyrene.

5. The foamed composition recited in claim 2 wherein said second phase polymeric material is latex.

6. The foamed composition recited in claim 2 wherein said matrix material is an amorphous polymer.

7. The foamed composition recited in claim 2 wherein said matrix material is an amorphous polymer and said second phase material is an amorphous polymer.

8. The foamed composition recited in claim 2 wherein said polymeric matrix material is polycarbonate and said second phase material is rubber.

9. The foamed composition recited in claim 2 wherein said polymeric matrix material is polyester and said second phase material is rubber.

10. The foamed composition recited in claim 2 wherein said polymeric matrix is an amorphous polymer and said second phase material is a semicrystalline polymer.

11. The foamed composition recited in claim 2 wherein said polymeric matrix material is polyethylene and said second phase material is rubber.

12. The foamed composition recited in claim 2 wherein said polymeric matrix material is polyethylene and said second phase material is polystyrene.

13. The foamed composition recited in claim 2 wherein said polymeric matrix material is polyetherimide and said second phase material is polypropylene.

14. The foamed composition recited in claim 2 wherein said polymeric matrix material is polyetherimide and said second phase material is polyethylene.

15. The foamed composition recited in claim 2 wherein said polymeric matrix material is polyetherimide and said second phase material is rubber.

16. The foamed composition recited in claim 2 wherein said polymeric matrix material is polyphenylene oxide/styrene and said second phase material is rubber.

17. The foamed composition recited in claim 2 wherein said foamed structures are microcellular.

18. The foamed composition recited in claim 2 wherein said matrix material is polyphenylene oxide/styrene, 19. The foamed composition recited in claim 2 wherein said polymeric matrix material is semicrystalline polymer.

20. The foamed composition recited in claim 2 wherein said polymeric matrix material is semicrystalline polymer and said second phase material is an amorphous polymer.

21. The foamed composition recited in claim 2 wherein said polymeric matrix material is semicrystalline polymer and said second phase material is semicrystalline polymer.

22. A polymeric composition that can be foamed to have a predictable cell size and density comprising:
    a matrix polymeric material;
    a second phase solid polymeric material blended with said matrix material and having a lower transition temperature than said matrix polymeric material;
    said second phase having a concentration between 0.001 and 18 volume percent and having a particle size of from 0.02 to 10 microns;
    said second phase promoting essentially predictable heterogeneous nucleation and growth of closed cells comprising a gas.

23. A microcellular foamed polymer composition, comprising:
    a polymer matrix material; and
    a second phase solid polymeric material which has a transition temperature below the transition temperature of said polymeric matrix material, said second phase polymeric material comprising rubber present in the composition in an amount of 0.1 to 10% by volume on a pre-foamed basis, the second phase polymeric material being a nucleating agent for a plurality of closed cells comprising a gas in said foamed polymer composition.

24. The composition of claim 23 wherein the polymer matrix material comprises polystyrene and wherein the closed cell size is below about 10 microns.

25. The composition of claim 24 wherein the second phase polymeric material comprises high impact polystyrene.

26. The composition of claim 23 wherein the polymer matrix material is selected from the group consisting of polycarbonate, polyester, polyethylene, polyetherimide, and polyphenylene oxide/polystyrene and wherein the closed cell size is below about 10 microns.

27. A microcellular foamed polymer composition produced by the process of:
   (a) providing a matrix polymeric material;
   (b) blending from 0.001 to 18 volume percent of a second phase particulate solid polymeric material having a particle size of from 0.02 to 10 microns which has a transition temperature below the transition temperature of said matrix polymeric material into said matrix polymeric material to form a polymeric pre-foam; and
   (c) foaming said polymeric pre-foam to form said microcellular foamed polymer composition having a plurality of closed cells comprising a gas.

28. The microcellular foamed polymer composition of claim 27 wherein the size of the closed cells is below about 10 microns.

29. The microcellular foamed polymer composition of claim 28 wherein the polymeric matrix material is selected from the group consisting of polyester, polyethylene, polystyrene acrylo nitril, polyphenylene oxide/polystyrene, polycarbonate, polyetherimide, polypropylene, nylon, and teflon.

30. The microcellular foamed polymer composition of claim 28 wherein the polymeric matrix material is polystyrene.

31. The microcellular foamed polymer composition of claim 30 wherein the second phase material is high impact polystyrene.

32. The microcellular foamed polymer composition of claim 30 wherein the second phase material is rubber.

33. A foamed polymer composition comprising:
   (a) a polymeric matrix material; and
   (b) a plurality of closed cells, within said polymeric matrix material, said closed cells comprising a gas enclosed by a shell comprising a second phase solid polymeric material having a transition temperature below the transition temperature of said polymeric matrix material, said second phase polymeric material having a concentration between 0.001 to 18 volume percent on a pre-foamed basis and wherein said second phase polymeric material is a nucleating agent and cell size controlling agent for said plurality of closed cells.

34. The polymeric composition of claim 33 wherein the size of the closed cells is below 40 microns.

35. The polymeric composition of claim 33 wherein the size of the closed cells is below about 10 microns.

36. The polymeric composition of claim 35 wherein the polymeric matrix material is polystyrene.

37. The polymeric composition of claim 36 wherein the second polymeric material comprises rubber particles present in an amount of from 0.1–10% by volume on a pre-foamed basis.

38. The polymeric composition of claim 22 wherein the polymeric matrix material comprises polystyrene.

39. The polymeric composition of claim 38 wherein the second phase polymeric material comprises rubber particles present in an amount of from 0.1–10% by volume on a pro-foamed basis.

* * * * *

UNITED STATES PATENT AND TRADEMARK OFFICE
CERTIFICATE OF CORRECTION

PATENT NO. : 5,369,135
DATED : November 29, 1994
INVENTOR(S) : Gregory A. Campbell and Don H. Rasmussen It is certified that error appears in the above-indentified patent and that said Letters Patent is hereby corrected as shown below:

On the title page,
  After "[73] Assignee:" please delete "Mobil Oil Corporation, Fairfax, Va." and insert therefor -- Castle Associates, Potsdam, New York --.

Signed and Sealed this

Twenty-fifth Day of June, 1996

Attest:

BRUCE LEHMAN

Attesting Officer        Commissioner of Patents and Trademarks